(12) United States Patent
Kowalski (10) Patent No.: US 11,142,404 B2
(45) Date of Patent: Oct. 12, 2021

(54) FORMABLE WING UP LAGGING

(71) Applicant: Punching Concepts, Inc., Alpena, MI (US)

(72) Inventor: Nicholas L. Kowalski, Posen, MI (US)

(73) Assignee: Punching Concepts, Inc., Alpena, MI (US)

( * ) Notice: Subject to any disclaimer, the term of this patent is extended or adjusted under 35 U.S.C. 154(b) by 0 days.

(21) Appl. No.: 16/814,020

(22) Filed: Mar. 10, 2020

(65) Prior Publication Data

US 2021/0284458 A1  Sep. 16, 2021

(51) Int. Cl.
*B65G 39/02* (2006.01)
*B65G 23/04* (2006.01)
*B65G 39/073* (2006.01)
*B29D 99/00* (2010.01)

(52) U.S. Cl.
CPC ....... *B65G 39/073* (2013.01); *B29D 99/0032* (2013.01); *B65G 2201/042* (2013.01); *B65G 2207/48* (2013.01)

(58) Field of Classification Search
None
See application file for complete search history.

(56) References Cited

U.S. PATENT DOCUMENTS

| | | | |
|---|---|---|---|
| 3,046,805 A | 7/1962 | Van Gorp | |
| 3,168,781 A * | 2/1965 | Van Gorp | B65G 39/02 29/469 |
| 3,354,735 A | 11/1967 | Holz | |
| 3,363,476 A | 1/1968 | Brown | |
| 3,392,594 A | 7/1968 | Van Gorp | |
| 4,233,853 A | 11/1980 | Holz | |
| 4,284,409 A | 8/1981 | Teslaar | |
| 4,308,019 A | 12/1981 | Horkey et al. | |
| 4,464,149 A | 8/1984 | Klyn | |
| 4,718,544 A | 1/1988 | Herren | |
| 4,836,361 A * | 6/1989 | Herren | B65G 39/02 198/843 |
| 4,956,914 A | 9/1990 | Valster et al. | |
| 6,443,297 B1 | 9/2002 | Johnston | |
| 8,739,965 B2 | 6/2014 | Laughlin | |

(Continued)

FOREIGN PATENT DOCUMENTS

DE 3224593 1/1983
EP 2135824 12/2009

*Primary Examiner* — Kavel Singh
(74) *Attorney, Agent, or Firm* — Warner Norcross + Judd LLP (57) ABSTRACT

A longitudinally and radially formable wing tip lagging that can be formed to match non-linear wing tip profiles. The longitudinally and radially formable wing tip lagging serves as a wear surface that can be replaced as it is worn rather than wearing down the ferrous or non-ferrous wing tips permanently affixed to the outermost positions of the wing pulley. The wing tip lagging includes a backing plate and a sacrificial stratum. The backing plate is the primary structural component and it includes a plurality of bending features that facilitate both longitudinal and radial forming of the wing tip lagging. The bending features may include a plurality of notches or slots formed along the backing plate. For example, the notches may be arranged in a regular repeating pattern along the length of the backing plate.

16 Claims, 7 Drawing Sheets

(56) References Cited

U.S. PATENT DOCUMENTS

| | | | |
|---|---|---|---|
| 8,857,606 B2 * | 10/2014 | Kowalski | B65G 39/02 198/835 |
| 9,284,125 B2 | 3/2016 | Laughlin | |
| 10,442,631 B2 | 10/2019 | Kowalski et al. | |
| 2009/0107804 A1 | 5/2009 | Zeltwanger et al. | |

* cited by examiner

FORMABLE WING UP LAGGING

BACKGROUND OF THE INVENTION

The present invention relates to belted conveyor systems, and, more particularly, to wing pulleys for belted conveyor systems.

Conventional belted conveyor systems typically include a conveyor belt carrying products or materials that is driven, supported and/or guided by a plurality of conveyor pulleys. Conveyor pulleys are provided in a number of different types. For example, standard conveyor pulleys include a solid cylindrical outer surface that engages the conveyor belt, while wing pulleys include an arrangement of spaced-apart radial "wings" that engage the conveyor belt. Wing pulleys are used in positions where debris is present as a method to not compress material between the solid surface of the pulley and the belt. The first generation of wing pulleys consisted of wing tips that are generally linear with wing tips that come into contact with the belt perpendicular to the direction of belt travel. This allowed the use of linear rigid backed wing tip lagging with limited to no longitudinal forming required. Examples of linear wing tip lagging for this first generation of pulley includes U.S. Pat. No. 5,209,704 to Valster, et al.; U.S. Pat. No. 3,363,476 to Brown; U.S. Pat. No. 3,392,594 to Van Gorp; U.S. Pat. No. 4,464,149 to Klyn; and U.S. Pat. No. 4,836,361 to Harren.

The second generation of wing pulleys was introduced in 2007. For example, U.S. Pat. No. 7,527,142 to Zeltwanger et al; U.S. Publ. Nos. 2011/0315517 and 2012/0186945 to Laughlin, and U.S. Pat. No. 8,857,606 to Kowalski et al disclose a second generation of wing pulleys that include angled wings, which have wing tips that are of various non-linear profiles. Given that the outermost edges of the angled wings are typically configured to cooperatively define a cylindrical profile, each individual angled wing tip is nonlinear and typically follows a complex, compound curve with components of curvature along both the longitudinal and radial axes. As a result, the various nonlinear wing tip profiles are unable to utilize the rigid linear wing tip laggings used in the first-generation examples cited hitherto. As a result, the current standard practice in the industry is not to use wing tip lagging with second generation wing pulleys.

SUMMARY OF THE INVENTION

The present invention provides a formable wing tip lagging fittable to nonlinear wing tips of an angled wing pulley. The formable wing tip lagging generally includes a backing plate and a sacrificial stratum. The backing plate is a structural component configured to be affixed to the wing tips of an angled wing pulley and to function, in part, as a carrier for the sacrificial stratum. The sacrificial stratum is affixed to the backing plate and provides an interface with the conveyor belt. In one embodiment, the backing plate is a generally continuous longitudinally-extending component with a plurality of bending features configured to facilitate forming of the wing tip lagging along both longitudinal and radial axes.

In one embodiment, the bending features are slots or notches formed into opposite sides of the backing plate to create gaps in the backing plate to facilitate bending/forming of the wing tip lagging. The number, size, shape and arrangement of notches may vary from application to application. For example, the width of the notches may be selected to prevent the notches from closing throughout the desired range of formability. In one embodiment, the notches are generally triangular in shape with sufficient size so as not to close before the lagging reaches the desired finished formed profile. In addition or as an alternative to notches, the backing plate may include an arrangement of grooves, slots or other reliefs or reductions in thickness. In some applications, the backing plate may include gussets or folds in the flanges that facilitate controlled bending. In some applications, the wing tip lagging may additionally have a reduced backing plate thickness to facilitate forming.

In one embodiment, the bending features are disposed along the backing plate in a regular repeating pattern. For example, a bending feature may be disposed every 2" along each side of the backing plate. The spacing of the bending features may vary from application to application depending on the nature of the bending profile for the lagging. For example, closer spacing may be provided when more severe bending is desired. In some applications, the spacing of the bending features may not be uniform, but instead may vary along the length of the backing plate in correspondence with the desired bending profile. For example, closer spacing may be provided in regions with more severe bending and greater spacing may be provided in regions with less severe bending.

In one embodiment, the backing plate is configured to be closely fitted over the outermost portion of the wing tip. In one embodiment, the backing plate includes a longitudinally extending main web that corresponds in shape with the outermost portion of the wing tip. In the context of a round wing tip, the main web may be generally semi-circular with an inner diameter corresponding with the outer diameter of the wing tip. The backing plate may also include a pair of flanges that extend inwardly from the longitudinal edges of the main web. The flanges may be substantially linear and parallel giving the backing plate a somewhat U-shaped cross section.

In one embodiment, the bending features are disposed in the flanges on opposite sides of the backing plate. In some embodiments, the bending features do not extend into the main web or into the sacrificial stratum, but that is not strictly necessary. In one embodiment, the notches, slots or other bending features may begin at the free edges of the flanges and extend transversely toward the main web, thereby facilitating bending or other forming of the flanges. In some applications, the bending features may laterally traverse the flanges, with each feature extending from the longitudinal free edge to the main web. For example, in embodiments in which the bending features are slots, the slots may be formed into the flanges from the longitudinal edge inwardly to a point adjacent the main web.

In one embodiment, the sacrificial stratum is mounted to the outer surface of the backing plate, for example, to the outer surface of the main web in those applications in which the backing plate has a main web and a pair of flanges. The sacrificial stratum may cover all or a portion of the backing plate. In the illustrated embodiment, the sacrificial stratum may be essentially coextensive with the main web of the backing plate. As shown, the sacrificial stratum may be generally semi-circular having an inner diameter corresponding with the outer diameter of the main web. The sacrificial stratum may be essentially any material or compound capable of being affixed to the backing plate. For example, the sacrificial stratum may be ferrous or non-ferrous, organic or inorganic material, and may be attached by welding, adhesives, cement, fasteners or mechanical interlocking.

In one embodiment, the sacrificial stratum is manufactured from styrene butadiene rubber ("SBR"), and is affixed to the backing plate through a direct-attach vulcanization process. The sacrificial stratum may alternatively be natural rubber or other elastomers (natural or synthetic).

In the illustrated embodiment, the sacrificial stratum is a single continuous element extending the full length of the backing plate, but it may be formed from separate segments and may extend over less than the full length, as desired.

In another aspect, the present invention provides a method for adding a formable wing tip lagging to a wing tip of an angled wing pulley. The method includes the general steps of providing a wing tip lagging having a backing plate and a sacrificial stratum, forming the backing plate with bending features, forming the wing tip lagging in place on the wing tip by positioning a starting portion of the wing tip lagging on the wing tip and progressively bending the wing tip lagging to follow the profile of the wing tip and affixing the wing tip lagging to the wing tip. In one embodiment, the method further includes the step of segmenting the wing tip lagging into a plurality of segments with a break configured to coincide with abrupt variations in the profile of the wing tip.

In one embodiment, the wing tip lagging is secured to the wing tip by crimping. More specifically, the wing tip lagging is formed and fitted over the wing tip and then the flanges are crimped together to close on the wing tip. For example, in the context of a wing tip with a round cross section, the wing tip lagging may be generally U-shaped in cross section with a backing plate having a semicircular cross section sized and shaped to fit closely over the wing tip, and the flanges may extend from opposite edges of the main beam forming parallel side walls. The wing tip lagging may be fitted onto the wing tip until the main beam is closely fitted onto the wing tip, and then the flanges may be crimped around the wing tip causing them to bend and tightly close about the wing tip to lock the wing tip lagging in place. The wing tip lagging may be, additionally or alternatively, secured using other techniques and apparatus, such as welding, adhesive, cement, fasteners and other types of mechanical interlocking.

In another aspect, the present invention provides a method for forming a wing tip lagging with a backing plate and a sacrificial stratum wherein the sacrificial stratum is a rubber material that is joined to the backing plate in a vulcanization process. The method may include the general steps of: (a) providing two backing plates, (b) wrapping rubber around the two backing plates with the rubber engaging the backing plate only in regions where attachment between the backing plate and the rubber is desired, (c) vulcanizing the rubber while it remains engaged with the backing plates to join the rubber to the two backing plates and (d) cutting the rubber to separate the assembly into two wing tip laggings. In one embodiment, a mask is disposed between the backing plates and the rubber during the vulcanization process to prevent the rubber from adhering to the backing plates in regions where attachment is not desired. The mask may be in the form of a masking tape that can be adhesively applied to the backing plates and peeled away thereafter. The masking tape may include an integrated trim wire that can be pulled away from the backing plates to cut through the rubber after vulcanization, but before the rubber has fully cured. Removal of the trim wires allows the sections of masking tape to be removed and the rubber to be cut in single action.

The present invention provides a replaceable wing tip lagging that is longitudinal and radially formable and therefore capable of installation on non-linear wing tips. The sacrificial stratum cover with sacrificial wing tip lagging to extend the life of the wear surfaces of an angled wing pulley and the conveyor belt. Longitudinally and radially formable wing tip lagging provides the user the ability to form the present invention to match the non-linear profile for the wing tips. The formable wing tip lagging can be easily removed and replaced on a second-generation angled wing pulley when worn. While the formable wing tip lagging is designed for use on non-linear or angled wing pulleys, it can also accommodate straight wing pulleys. The sacrificial stratum can be efficiently and firmly connected to the backing plate using the vulcanization method described herein. By vulcanizing two back-to-back wing tip laggings at the same time, rubber can be wrapped without the need for a mandrel or a mold. The use of a masking material provides control over where the rubber is joined to the backing plates and allow easy separation and trimming of the two wing tip laggings.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

Figures 1A, 1B:
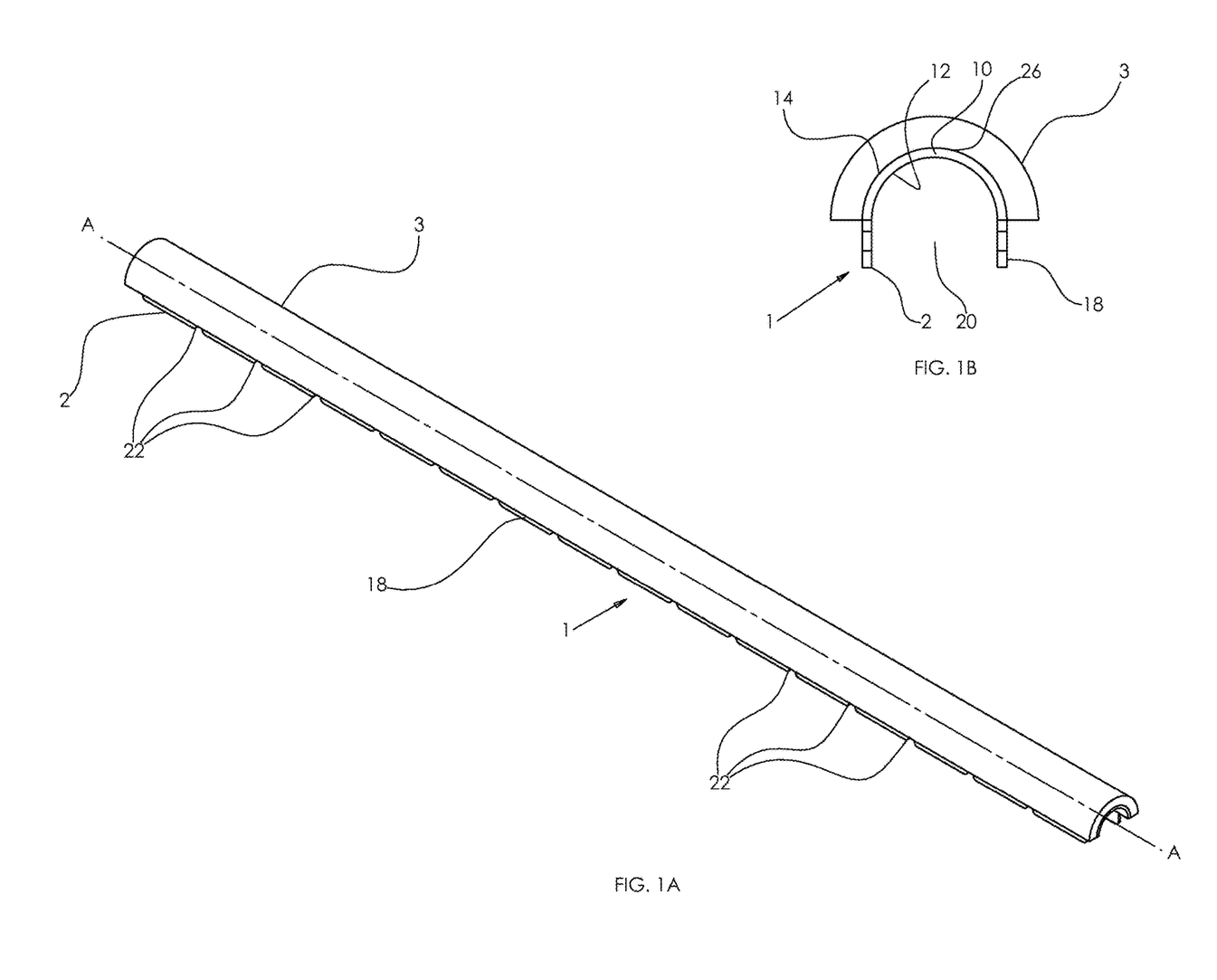
FIG. 1A is a perspective view of a formable wing tip lagging in accordance with an embodiment of the present invention.
FIG. 1B is an end view of the wing tip lagging.

A formed wing tip lagging in accordance with an embodiment of the present invention is shown in FIG. 1A. FIG. 1A is an example of a formable wing tip lagging assembly that is capable of being formed both longitudinally and radially to allow its installation on nonlinear pulley wings. In this embodiment, a ductile backing plate 2 is formed in the general shape of the pulley wing tip that the assembly will be secured thereon. For example, FIGS. 1A and 1B show a wing tip lagging 1 (prior to forming) configured to be mounted to a wing tip that is round in cross section. In this embodiment, the backing plate 2 has a generally U-shaped cross-section with an open mouth wide enough to be fitted over the wing tip. The backing plate 2 includes a plurality of notches formed along the backing plate 2 from opposite sides to facilitate both longitudinal and radial bending. The sacrificial stratum 3 is bonded to the backing plate 2. In this illustration, the backing plate 2 and the sacrificial stratum 3 are formed for use with round wing tips, such as wing tips manufactured from round bar stock. However, the backing plate 2 and the sacrificial stratum 3 could be formed for use with any shape of wing tip, which could include, but are not limited to hex, flat, oval, half round, etc. The wing tip lagging 1 can be removed and replaced once the sacrificial stratum 3 has been worn past its useful life.

As noted above, the wing tip lagging 1 is formed from an assembly of a backing plate 2 and a sacrificial stratum 3. In the illustrated embodiment, the backing plate 2 is the primary structural component intended to support the sacrificial stratum 3 and be affixed to the wing tip 16. The size, shape and configuration of the backing plate 2 are generally selected to match with the wing tip 16 upon which the wing tip lagging 1 will be installed. In the embodiment of FIGS. 1A and 1B, the wing tips 16 are generally round in cross section being formed, for example, from sections of round stock. As shown, the backing plate 2 of this embodiment generally includes a curved web 10 having an inner radius 12 corresponding with the outer radius 14 of the wing tip 16 and a pair of generally linear flanges 18 (or sidewalls) that extend from opposite longitudinal edges of the web 10. The flanges 18 are spaced apart and define a mouth 20 of sufficient width to receive the wing tip 16. The illustrated backing plate 2 is merely exemplary. The size, shape and configuration of the backing plate 2 may vary from application to application. For example, as discussed in more detail below, the backing plate 2' of FIGS. 4 and 5 may have more of a squared cross sectional shape with a linear main web 10' and linear flanges 18' (or sidewalls) extending from opposite edges of the linear web.

As noted above, the wing tip lagging 1 includes bending features. In the illustrated embodiment, the bending features are slots or notches 22 formed into opposite sides of the backing plate 2 to create gaps that facilitate forming of the wing tip lagging. For example, the backing plate 2 in the figure is depicted with a plurality of notches 22 defined along the longitudinal axis A to ease longitudinal formability and radial formability. In this embodiment, the notches 22 are formed in the flanges 18 or sidewalls of the backing plate 2, thereby providing voids 24 into which the sidewalls can collapse when bent convexly along the longitudinal axis (See FIG. 2B), as well as breaks along with the sidewalls that allow separation when bending radially (See FIG. 2C) or in other directions or along other axes. The number, size, shape and arrangement of notches may vary from application to application. In the illustrated embodiment, the bending features are disposed along the backing plate 2 in a regular repeating pattern. The spacing of the bending features 22 may vary from application to application depending on the nature of the bending profile for the lagging 1. To illustrate, closer spacing may be provided when more severe bending is desired and wider spacing may be provided when less sever bending is desired. For example, a bending feature (e.g. notch 22) may be disposed about every 2" along each side of the backing plate 2, but the spacing in some embodiments may be in a range of between 0.5" and 6". In some applications, the spacing of the bending features may not be uniform, but instead may vary along the length of the backing plate 2 in correspondence with the desired bending profile. For example, closer spacing may be provided in regions with more severe bending and greater spacing may be provided in regions with less severe bending. The widths of the notches 22 may vary from application to application and may be selected to prevent the notches 22 from closing throughout the desired range of formability. For example, the notch 22 width may be selected as a function of the maximum desired amount of convex bending along the longitudinal axis, and more specifically so that the notch 22 closes or just about closes as the backing plate 2 reaches the maximum extent of such convex bending about that notch 22 (as shown, for example, in FIG. 2B). The notches 22 of the illustrated embodiment have a width of approximately 0.25". This width is merely exemplary and the width may vary from application to application, such as in the range of 0.001" to 0.5". In one embodiment, the notches may be generally triangular in shape with the widest portion of the triangular being at the free edge of the flanges (not shown). The widest portion of the triangular notches may be of sufficient size so as not to close before the lagging is bent into the desired finished formed profile. Notches (or slots) are just one example of a bending feature that can be incorporated into the backing plate 2 to facilitate both longitudinal and radial bending. In addition or as an alternative to notches (or slots), the backing plate may include an arrangement of grooves, channels or other reliefs or reductions in thickness. In some applications, the backing plate 2 may include gussets or folds in the flanges that facilitate controlled bending (not shown). In some applications, the wing tip lagging 1 may have a reduced backing plate 2 thickness to facilitate forming.

In the illustrated embodiment, the sacrificial stratum 3 is mounted to the outer surface 26 of the backing plate 2, for example, to the outer surface 26 of the main web 10 in those applications in which the backing plate 2 has a main web 10 and a pair of flanges 18. The sacrificial stratum 3 may cover all or a portion of the backing plate 2 as desired to provide a replaceable interface surface between the wing pulley 4 and the conveyor belt (not shown). In the illustrated embodiment, the sacrificial stratum 3 may be essentially coextensive with the main web 10 of the backing plate 2. As shown, the sacrificial stratum 3 may be generally semi-circular having an inner diameter corresponding with the outer diameter of the main web 10. In the illustrated embodiment, the sacrificial stratum 3 is a single continuous element extending the full length of the backing plate 2, but it may be formed from separate segments and may extend over less than the full length of the backing plate 2, as desired.

In the illustrated embodiment, the sacrificial stratum 3 is manufactured from styrene butadiene rubber ("SBR"), natural rubber or other elastomers (natural or synthetic). However, the sacrificial stratum 3 may, in alternative applications, be essentially any material or compound capable of being affixed to the backing plate. For example, the sacrificial stratum 3 may be ferrous or non-ferrous, organic or inorganic material.

The sacrificial stratum 3 may be joined to the backing plate 2 by any suitable techniques and apparatus. In the illustrated embodiment, the sacrificial stratum 3 is SBR and is directly attached to the backing plate 2 as an integral part of a vulcanization process, as described in more detail below. The sacrificial stratum 3 may alternative or additionally be attached to the backing plate by welding, adhesives, cement, fasteners or mechanical interlocking.

While the FIG. 1 embodiment depicts a backing plate 2 and a stratum 3, any combination of one, both, or more wear layers could be used. For example, each of the backing plate 2 and the stratum 3 may be laminated or otherwise assembled for a plurality of separate components.

Figure 2A:
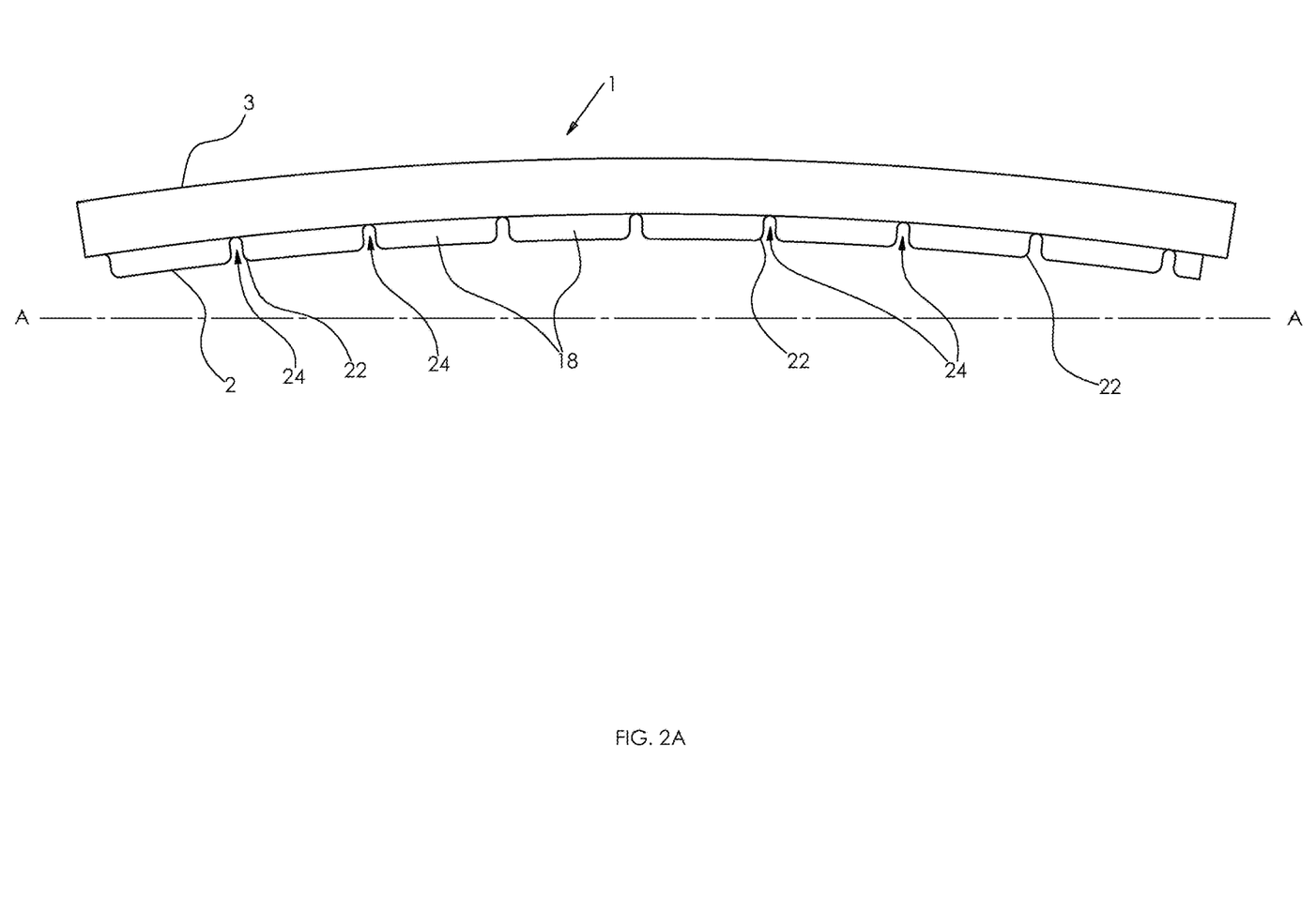
FIG. 2A is a side view of the wing tip lagging bent along the longitudinal axis.

As noted above, the wing tip lagging 1 is configured to be formed to match the profile of the existing wing tips 16 of a wing pulley 4. FIG. 2A provides a side view of the formable wing tip lagging 1 which has been formed longitudinally with respect to axis A to meet the profile of an example angled wing (not shown). While the depicted profile appears to be generally radial, the wing tip lagging 1 can be formed in a plethora of profiles to fit the corresponding wing pulley 4. For example, the wing tip lagging 1 can be formed to follow a compound curve that bends along both the longitudinal and radial axes of the wing tip lagging 1 as would be typical in conventional nonlinear wing pulley applications. As noted above, FIG. 2B is a representative illustration of the wing tip lagging 1 formed longitudinally and FIG. 2C is a representational illustration of the wing tip lagging 1 formed radially (e.g. twisted about the longitudinal axis). While FIGS. 2A-C depict the wing tip lagging 1 in different formed states separate from the pulley 4 in which it will be used, the longitudinal forming of this wing tip lagging 1 can be performed prior to, or at the point of installation, using the shape of the wing 7 as the pattern, as discussed in more detail below.

Figure 2B:
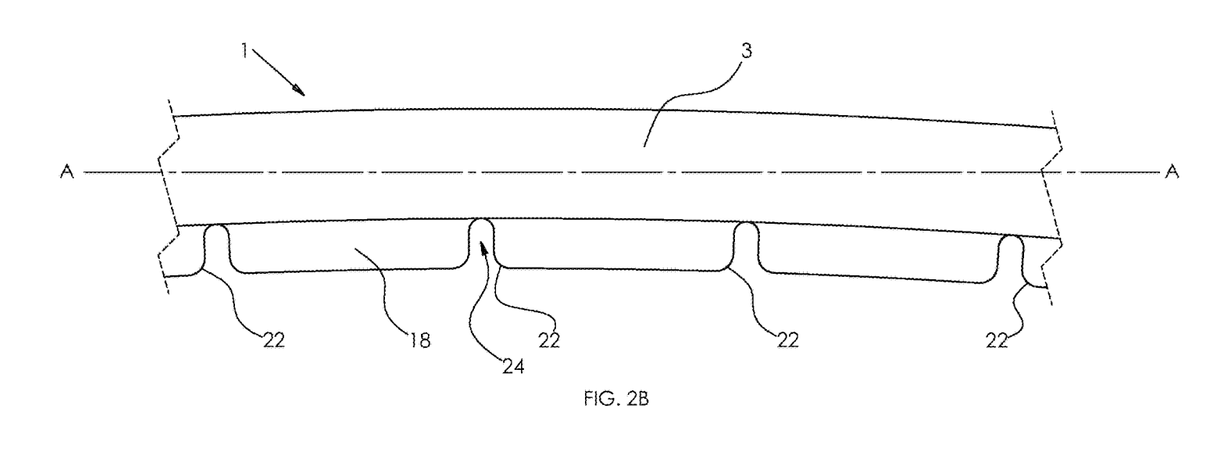
FIG. 2B is an enlarged side view of a portion of the wing tip lagging formed longitudinally.
Figure 2C:
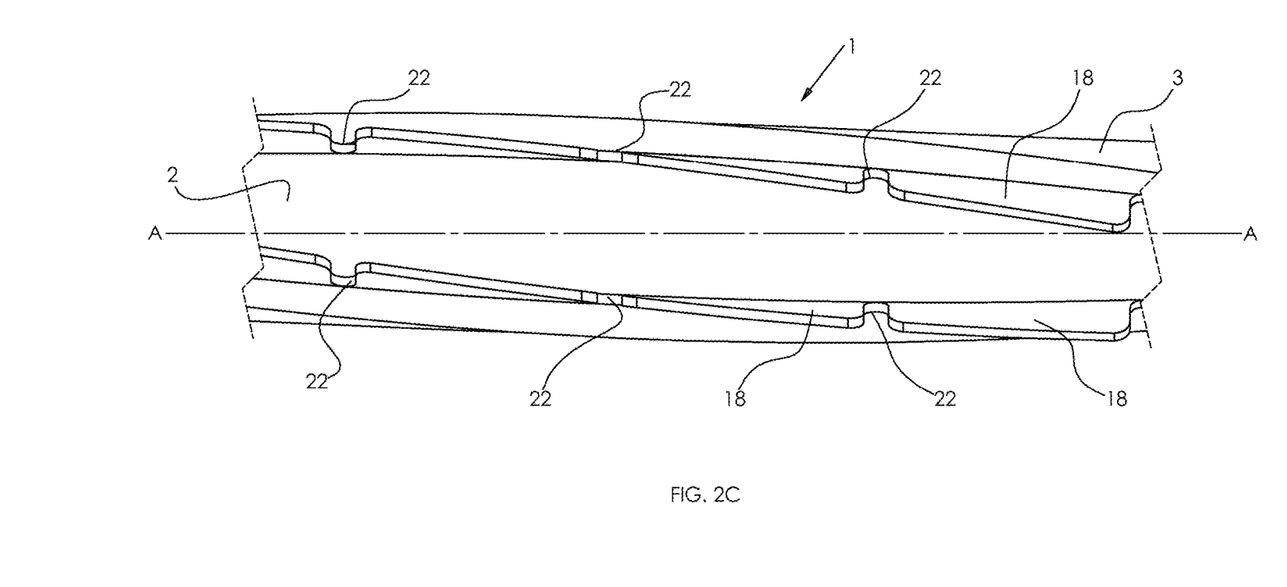
FIG. 2C is an enlarged side view of a portion of the wing tip lagging formed radially.
Figure 3:
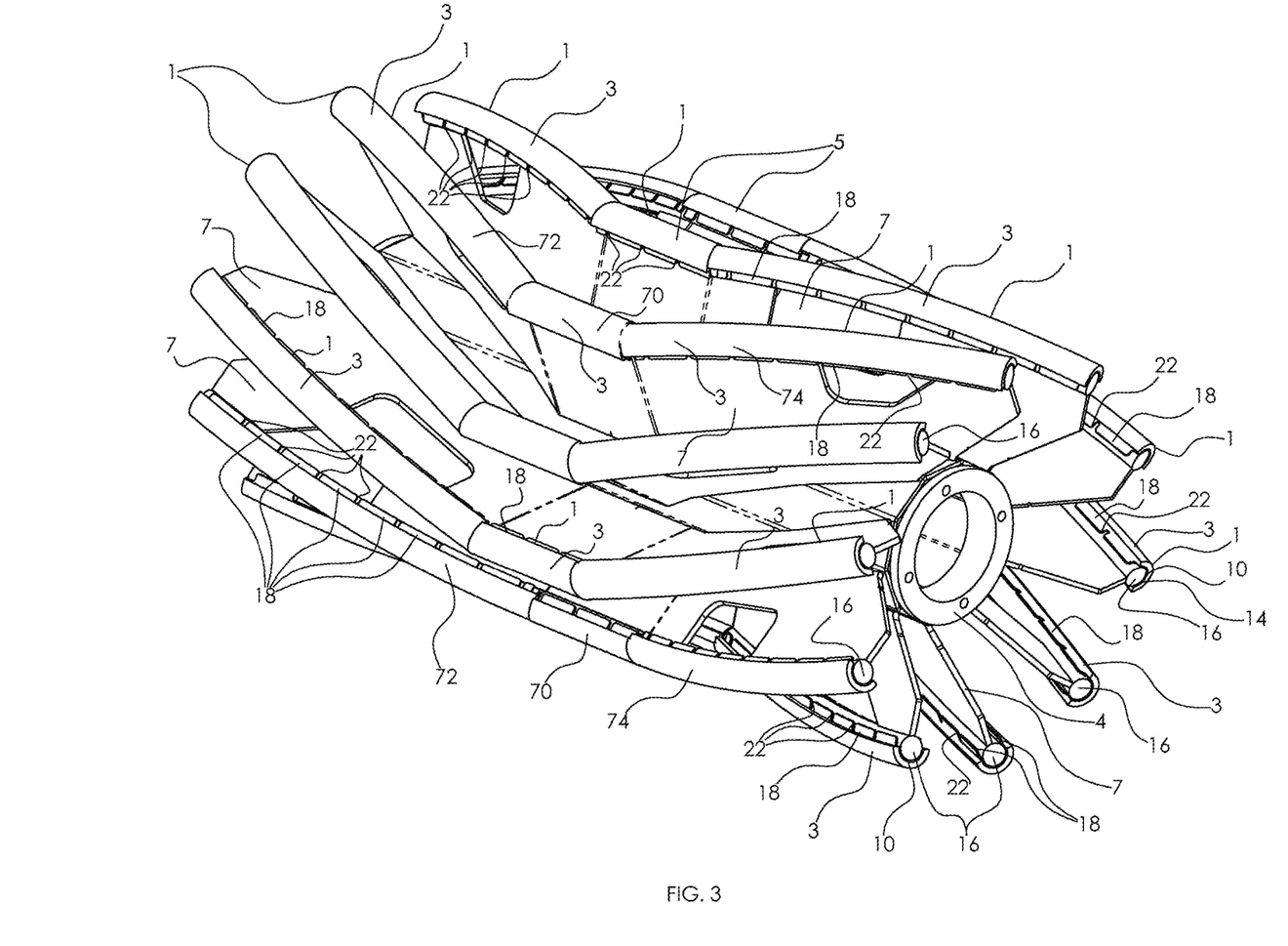
FIG. 3 is a perspective view of the wing tip lagging mounted to the wing tips of a wing pulley.

FIG. 3 provides an example of the formed wing tip lagging 1 of FIGS. 1A-B and 2A-C installed on a premium angled wing pulley 4. As can be seen, a wing tip lagging 1 is formed and fitted onto the wing tip 16 of each pulley wing 7. As described in more detail below, the wing tip lagging 1 may be secured to the wing tip 16 using any suitable techniques and apparatus. For example, friction could be used to hold the wing tip lagging 1 in place, or one or a combination of the following methods, but not limited to; adhesion, welding, crimping, mechanical fastening, etc. In the illustrated embodiment, the wing tip lagging 1 is affixed to the wing tips 16 by crimping the sidewalls 18 of the backing plate 2 together to close on the wing tip 16.

The present invention may be easily adapted for use on a wide range of complex non-linear wing tips. The wing tip lagging is capable of being formed to follow a segment of wing tip that curves longitudinal and/or radially. In some applications, a single length of wing tip lagging extends across the pulley following the longitudinal and radial curve in the wing tips. In other applications, the wings 7 or wing tips 16 may have breaks, discontinuities or abrupt changes. In such applications, the wings 7 or wing tips 16 may be more appropriately followed by segmenting the wing tip lagging 1 along the length of the wing tip 16 and installing it in segments rather than a single continuous length that extends fully across the wing pulley 4. With wings 7 that have breaks or discontinuities, the use of segments allows the wing tip lagging 1 to break in correspondence with the underlying wing tip profile. With abrupt changes, the use of segments allows the wing tip lagging 1 to follow changes in the shape of the underlying wing 7 or wing tip 16 that could not be followed or could not as easily be followed through a curve in the wing tip lagging 1. As a result, the method of installing the wing tip lagging 1 may further include the step of segmenting the wing tip lagging 1 into a plurality of segments with breaks configured to coincide with breaks, discontinuities and abrupt variations in the profile of the wing 7 or wing tip 16. Each segment of wing tip lagging 1 may be separately formed, fitted and secured to the corresponding wing tip 16 segment. For example, FIG. 3 shows a wing pulley 4 in which each wing 7 or wing tip 16 includes a linear central portion and wing-shaped side portions that gradually curve along both longitudinal and radial axes. The central portion is joined to the side portions at angled corners that could be difficult to follow closely by a curve. In implementations of this type, the wing tip lagging 1 may be installed in segments with a linear central lagging segment 70 fitted over the linear central wing tip portion and two formed side lagging segments 72 and 74 fitted over the side wing tip portions. In this embodiment, the central segment 70 is linear and is not formed, while the outer segments 72 and 74 are formed in the longitudinal and radial directions. Similarly, FIG. 5 shows an alternative embodiment in which the pulley wings and the wing tip lagging are formed in segments that extend over only a portion of the length of the pulley.

Figure 4:
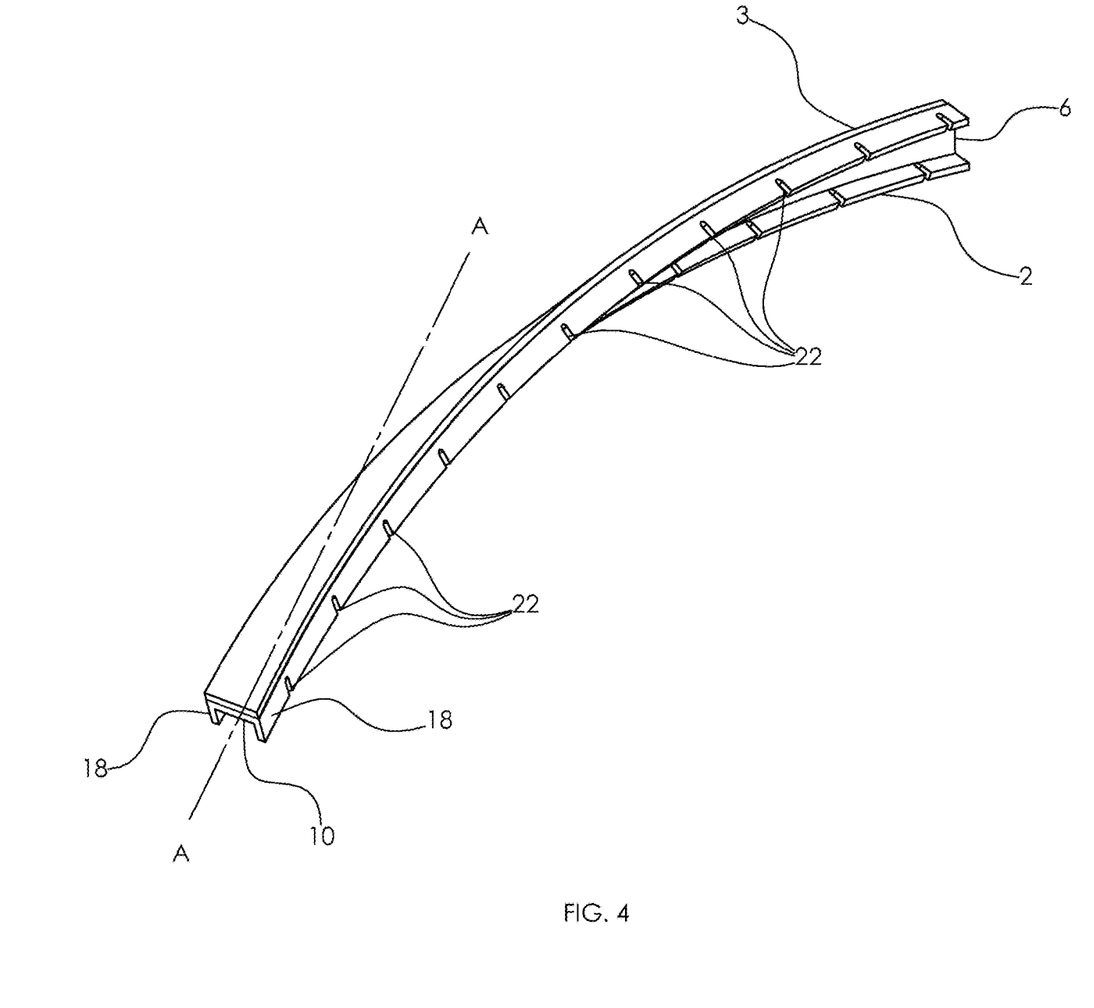
FIG. 4 is a perspective view of an alternative wing tip lagging formed longitudinally and radially.

The wing tip lagging of FIGS. 1-3 is merely exemplary. The size, shape and configuration of the wing tip lagging may vary from application to application, for example, to correspond with the wing tip used in that particular application. While FIG. 3 depicts wing tip lagging 1 on the pulleys 4 wing tips, the invention can also be fabricated to directly mount to the wing of the pulley if the pulley design does not include a wing tip. For example, FIGS. 4 and 5 show an embodiment of the wing tip lagging 6' configured to be fitted to the outermost edge of the pulley wings 7' (without wing tips). Referring to FIG. 5, the wings 7' of this exemplary pulley 4' are formed from sheet material having squared outermost edges. To facilitate installation on these wings 7', FIG. 4 provides an alternate example of formable wing tip lagging 6 which starts with a rectangular cross section to match the wing shape. This embodiment may be particularly well suited for installation on a wing pulley 4' in which the wings 7' do not include wing tips 16', but it is not limited to use directly on pulley wings 7' and can alternatively be mounted to wing tips that have a corresponding square cross-section. As with wing tip lagging 1, wing tip lagging 6' includes a plurality of bending features, such as notches 22' or slots, provided along the length of the wing tip lagging 6' to facilitate forming. In this example, the wing tip lagging 6' is formed longitudinally and radially with respect the longitudinal axis A to match a helical wing profile. In this embodiment, the backing plate 2' of the wing tip lagging 6' is manufactured with bending features 22' and from a ductile material having properties that allow it to be formed to the desired curvature without buckling, bending or creasing.

Figure 5:
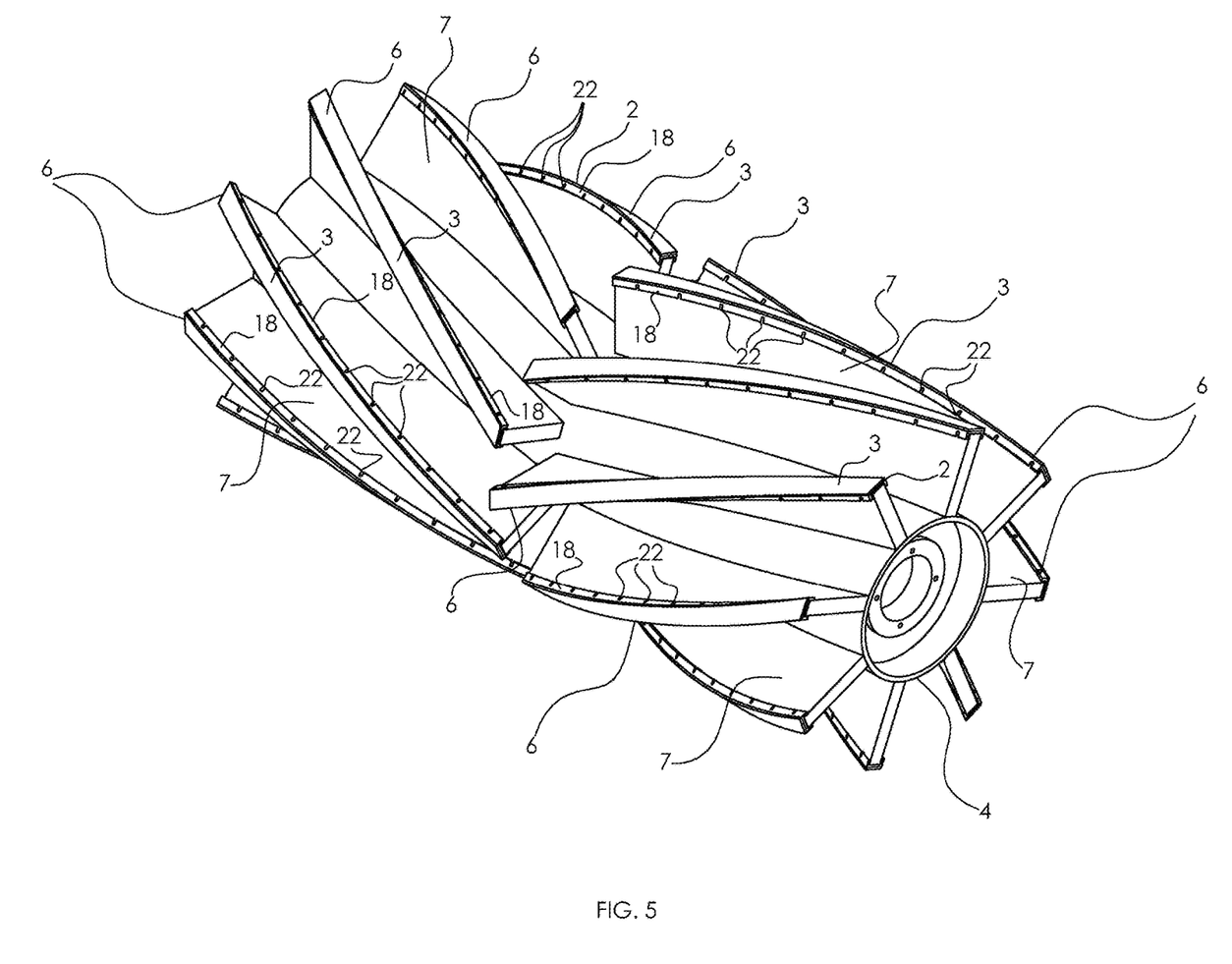
FIG. 5 is a perspective view of the alternative wing tip lagging of the wing pulley.

FIG. 5 provides an example of the formed wing tip lagging 6' depicted in FIG. 4 installed on an angled wing pulley 4' that does not include wing tips. In this embodiment, the wing pulley 4' has a plurality of helically shaped wings 7' that extend across only a portion of the length of the pulley 4'. For example, the wings are separated into left side and right side wing segments that are arranged in an offset pattern. As shown, a separate section of wing tip lagging 6 is fitted to the outermost edge of each wing.

In another aspect, the present invention provides a method for installing a formable wing tip lagging to a wing tip of an angled wing pulley. The method includes the general steps of providing a wing tip lagging having a backing plate and a sacrificial stratum, providing the backing plate with bending features that facilitate bending of the wing tip lagging, forming the wing tip lagging in place on the wing tip by positioning a starting portion of the wing tip lagging on the wing tip and progressively bending the wing tip lagging to follow the profile of the wing tip while fitting the wing tip lagging onto the wing tip and affixing the wing tip lagging to the wing tip. For example, one end of an unformed section of wing tip lagging 1 may be fitted onto the corresponding end of the wing tip 16. The wing tip lagging 1 can then be progressively bent both longitudinally and radially as needed to match the shape of the underlying wing tip 16. As the wing tip lagging 1 is bent, the notches 22 in the associated portion of the wing tip lagging 1 close or separate as appropriate to achieve the desired shape. As it is progressively bent into the proper shape, the wing tip lagging 1 can be increasingly fitted onto the wing tip 16. The process of bending and fitting the wing tip lagging 1 onto the wing tip 16 can occur in one continuous process, if desired. This process can also be used to install lagging directly to the wings of the wing pulley that does not include wing tips, such as shown in FIGS. 4 and 5.

Although not shown, the wing tip lagging 1 can be formed separate from the wing pulley using a jig or pattern. For example, a jig or pattern corresponding in shape with the wing tip 16 can be produced and the wing tip lagging 1 can be formed onto the jig or pattern prior to installation on the wing pulley 4 (e.g. the wing tip of FIG. 3 or the free edge of the wing of FIG. 5).

Once the wing tip lagging 1 has been formed and fitted onto the wing tip 16, it may be secured to the pulley wing 7. The wing tip lagging 1 may be secured using any suitable techniques or apparatus. In the illustrated embodiment, the wing tip lagging 1 is secured to the wing tip 16 at least by crimping. More specifically, the wing tip lagging 1 is formed and fitted over the wing tip 16, and then a portion of the backing plate 2 is crimped to close tightly about the wing tip 16. For example, in the context of a wing tip 16 with a round cross section, the wing tip lagging 1 may be generally U-shaped in cross section with a backing plate 2 having a main web 10 with a semicircular cross section sized and shaped to fit closely over the wing tip 16, and flanges 18 that extend from opposite edges of the main web 10 forming parallel sidewalls. The wing tip lagging 1 may be fitted onto the wing tip 16 until the main web 10 is closely fitted onto the wing tip 16, and then the flanges 18 may be crimped around the wing tip 16 causing them to bend and tightly close about the wing tip 16 to lock the wing tip lagging 1 in place. In the illustrated embodiment, the flanges are crimped about the wing tip 16 along the full length of the wing tip lagging 1. However, in alternative embodiments, only a portion of the flanges may be crimped onto the wing tip. In the illustrated embodiment, the notches 22 divide each flange 18 into a plurality of generally separate tab-like divisions that can be separately crimped, as desired. For example, every other tab-like division may be crimped or any other crimping pattern may be used as needed to provide the desired interconnection between the wing tip lagging and the wing tip. Crimping is only one possible method for securing the wing tip lagging 1 to the wing tip 16. In other embodiments, the wing tip lagging 1 may be, additionally or alternative, secured using other techniques and apparatus, such as welding, adhesive, cement, fasteners and other types of mechanical interlock.

Figure 6:
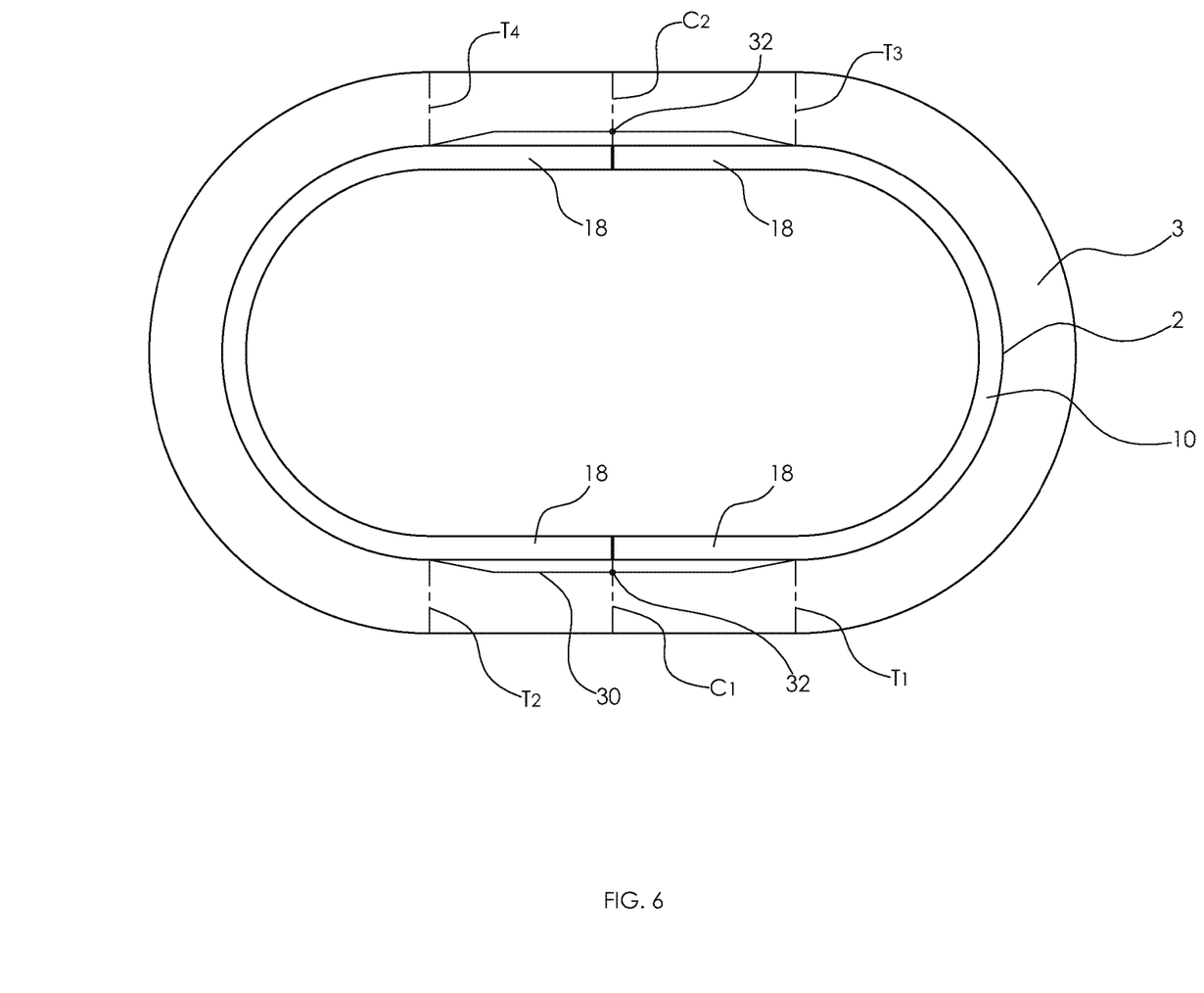
FIG. 6 is an end view of a wing tip lagging assembly for use in a vulcanization method in accordance with an embodiment of the present invention.

As noted above, the sacrificial stratum 3 may, in some applications, be vulcanized rubber, and the vulcanized rubber may be directly attached to the backing plate 2 as an integral part of the vulcanization process. In another aspect, the present invention provides a method for joining the sacrificial stratum 3 to the backing plate 2 where the sacrificial stratum 3 is a vulcanizable material joined to the backing plate 2 in a vulcanization process. The method may include the general steps of: (a) providing two backing plates 2, (b) wrapping rubber 3 around the two backing plates 2 with the rubber 3 engaging the backing plates 2 only in regions where attachment between the backing plates 2 and the rubber 3 is desired (See, for example, FIG. 6), (c) vulcanizing the rubber 3 while it remains engaged with the backing plates 2 to join the rubber 3 to the two backing plates 2, and (d) cutting and trimming the rubber 3 to separate the assembly into two wing tip laggings 1. In the illustrated embodiment, the backing plates are generally U-shaped and are positioned mouth-to-mouth to form a generally closed shape. For example, as shown in FIG. 6, the backing plates 2 may be positioned with the longitudinal edges of the flanges 18 in direct contact with one another. The backing plates 2 may be closed from opposite sides about a form or fixture that helps to retain them in proper alignment. Although FIG. 6 shows the method in use with backing plates 2 with a generally U-shaped cross-section, the present method may be used with backing plates 2 of other cross-sectional shapes, such as the square cross-section of FIGS. 4 and 5. A section of uncured rubber, such as SBR or other vulcanizable elastomer, is wrapped around the outside of both backing plates 2 covering the main web 10. In this embodiment, the rubber is essentially coextensive with the outer surfaces of the main webs 10. The free edges of the rubber 3 may be held in place during vulcanization by mean of a temporary pressure wrap. In one embodiment, a mask is disposed between the backing plates 2 and the rubber 3 during the vulcanization process to prevent the rubber from adhering to the backing plates in regions where attachment is not desired. The mask may be in the form of a masking tape 30 that can be adhesively applied to the backing plates 2 and peeled away thereafter. The masking tape 30 may include an integrated trim wire 32 that can be pulled away from the backing plates 2 to cut through the rubber 3 after vulcanization, but before the rubber has fully cured. Removal of the trim wires 32 allows the sections of masking tape 30 to be removed and the rubber 3 to be cut in single action. One masking tape 30 with integrated trim wire 32 is available from WireTrim under the brand WireTrim. Referring again to FIG. 6, a length of masking tape 30 may be applied to each side of the backing plate assembly covering the outer surfaces of the flanges 18 on both sides of the backing plates 1. For example, after positioning the backing plates 1 mouth-to-mouth and before wrapping the rubber 3 around the backing plates 1, a length of masking tape 30 (or other mask) is applied to each side of the backing plate assembly. The masking tape 30 bridges the flanges 18 with the trim wire 32 positioned approximately where the opposed flanges 18 butt together. The masking tape 30 prevents the rubber 3 from coming in direct contact with the flanges 18 of the backing plate 1, thereby preventing the rubber 3 from bonding to the masked portions of the flanges 18. In the illustrated embodiment, the trim wire 32 is integrated into the mask. In alternative embodiments, the trim wire may be separate from the mask. For example, a trim wire may be positioned along the back plate and a mask may be applied over the trim wire. When the mask is a tape, the tape may hold the trim wire in place.

The backing plate assembly with masking and rubber may be vulcanized using generally conventional techniques and apparatus. For example, the assembly may be positioned in an autoclave and subjected to a conventional vulcanizing process. The vulcanization process may vary from application to application depending, for example, on the type of rubber or other elastomer used to form the sacrificial stratum.

After vulcanization is complete, the rubber 3 is cut to separate the two backing plates 1 from one another. For example, in applications that include trim wires 32, the method includes the step of pulling the wires 32 through the rubber cutting it along lines C1 and C2 immediately adjacent to the trim wires 32. In the illustrated embodiment, removal of the trim wires 32 cuts the vulcanized rubber 3 along lines adjacent to where the opposed flanges 18 butt together, but the wire 32 may be positioned in other locations. In this embodiment, the trim wire 32 can be pulled through the rubber 3 while the rubber 3 is still hot and relatively soft from the vulcanization process. Once the rubber 3 has cooled, pulling the trim wire 32 through the rubber 3 may be more difficult. In applications that do not involve a trim wire, the rubber 3 may be cut using other techniques and apparatus, such as a knife manually drawn over the rubber.

Following the cutting step, the rubber 3 may be trimmed using generally conventional techniques and apparatus. For example, a knife or shears may be used to trim excess rubber from opposite sides of the sacrificial stratum at lines T1, T2, T3 and T4. Trimming may be performed manually or automated, as desired.

In the illustrated embodiment, the method includes separate steps of cutting and trimming the vulcanized rubber. In alternative embodiments, the trimming and cutting steps may occur simultaneously. For example, in some applications, a pair of blades may be drawn along each side of the backing plate assembly to cut the rubber 3 on each side along two lines where it is desirable to trim the rubber 3, such as at T1 and T2 or at T3 and T4. In some applications, two trim wires may be used on each side of the backing plate assembly along the desired trim lines so that removal of the two trim wires results in a properly trimmed sacrificial stratum (not shown).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method for installing wing tip lagging onto a wing of a wing pulley, comprising the steps of:
    providing a wing tip lagging with a plurality of bending features, the bending features being further defined as a notch, a slot or another absence of material;
    fitting a starting portion of the wing tip lagging onto the wing;
    forming the wing tip lagging directly onto the wing by bending the wing tip lagging to match an underlying shape of the wing using the wing as a forming fixture, the forming being facilitated by the bending features; and
    securing the wing tip lagging in place on the wing;
    wherein the wing tip lagging includes a backing plate having a web and a pair of sidewalls extending from the web to define a mouth fitted over the wing, the bending features being disposed in the sidewalls.

2. The method of claim 1 wherein the step of securing the wing tip lagging includes crimping the sidewalls against the wing.

3. The method of claim 2 wherein the wing tip lagging includes a sacrificial stratum joined to an outer surface of the back plate; and
    further including the step of directly attaching the sacrificial stratum to the backing plate during a vulcanization process.

4. A method for installing wing tip lagging onto a wing of a wing pulley, comprising the steps of:
    providing a wing tip lagging with a plurality of bending features;
    fitting a starting portion of the wing tip lagging onto the wing;
    forming the wing tip lagging directly onto the wing by bending the wing tip lagging to match an underlying shape of the wing using the wing as a forming fixture, the forming being facilitated by the bending features; and
    securing the wing tip lagging in place on the wing;
    wherein the wing tip lagging includes a backing plate having a web and a pair of sidewalls extending from the web to define a mouth fitted over the wing.

5. The method of claim 4 wherein the bending features include a plurality of spaced apart notches defined in each of the sidewalls.

6. The method of claim 5 wherein each sidewall has a longitudinal free edge and each of the plurality of notches extends from the sidewall longitudinal free edge laterally into the sidewall.

7. The method of claim 6 wherein each of the plurality of notches traverses the sidewall from the sidewall longitudinal free edge to the web.

8. The method of claim 4 wherein the wing tip lagging includes a vulcanized rubber sacrificial stratum directly attached to the backing plate during a vulcanization process, the vulcanization process including the steps of:
    providing a pair of the backing plates, each of the backing plates having a web with an outer surface intended to receive a sacrificial stratum and a pair of sidewalls extending from the web to define a mouth suitable for fitting over a wing of a wing pulley, the sacrificial stratum being an elastomer capable of undergoing vulcanization;

positioning the backing plates mouth-to-mouth with the outer surfaces facing in opposite directions;

wrapping an unvulcanized elastomer around the backing plates to form an assembly, the unvulcanized rubber being in direct contact with the outer surfaces of the two backing plates;

vulcanizing the assembly while the rubber remains in contact with the outer surfaces, whereby the rubber becomes directly attached to the outer surfaces as an integral part of the vulcanization; and cutting the rubber following vulcanization to separate the assembly into two wing tip laggings.

9. The method of claim 8 further including the step of positioning a first mask between the unvulcanized elastomer and the sidewalls of the backing plates on one side of the assembly and a second mask between the unvulcanized elastomer and the sidewalls of the backing plates on the opposite side of the assembly.

10. The method of claim 9 further including the step of positioning a first trim wire between the unvulcanized elastomer and the backing plate on one side of the assembly and a second trim wire between the unvulcanized elastomer and the backing plate on the opposite side of the assembly.

11. The method of claim 10 further including the steps of:
removing the first trim wire by pulling it through the elastomer; and
removing the second trim wire by pulling it through the elastomer.

12. A method for installing a wing tip lagging onto a wing tip of a wing pulley, comprising the steps of:

providing a wing tip lagging, the wing tip lagging having a generally U-shaped backing plate with a main beam and a pair of flanges extending from the main beam in spaced-apart relation, the flanges cooperatively defining a mouth having a width sufficient to fit over the wing tip, each of the flanges including a plurality of bending features, each bending feature being defined by an absence of material;

fitting a starting portion of the wing tip lagging onto the wing tip;

forming the wing tip lagging directly onto the wing tip by bending the wing tip lagging to match an underlying shape of the wing tip using the wing tip as a forming fixture, the forming being facilitated by the bending features; and securing the wing tip lagging in place on the wing tip.

13. The method of claim 12 wherein each flange has a longitudinal free edge and each of the plurality of bending features extends from the flange longitudinal free edge laterally into the flange.

14. The method of claim 13 wherein each of the plurality of bending features traverses the flange from the flange longitudinal free edge to the main beam.

15. The method of claim 14 wherein the step of securing the wing tip lagging includes crimping the wing tip lagging onto the wing.

16. The method of claim 15 wherein the wing tip lagging includes a sacrificial stratum joined to an outer surface of the back plate; and further including the step of directly attaching the sacrificial stratum to the backing plate during a vulcanization process.

* * * * *

UNITED STATES PATENT AND TRADEMARK OFFICE
CERTIFICATE OF CORRECTION

PATENT NO. : 11,142,404 B2  
APPLICATION NO. : 16/814020  
DATED : October 12, 2021  
INVENTOR(S) : Nicholas L. Kowalski Page 1 of 1

It is certified that error appears in the above-identified patent and that said Letters Patent is hereby corrected as shown below:

On the Title Page

In the Title (54) and in the Specification, Column 1, Line 1:
"UP" should read --TIP--

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*